United States Patent [19]
Mann

[11] Patent Number: 5,975,491
[45] Date of Patent: Nov. 2, 1999

[54] COUPLING

[75] Inventor: Torsten Mann, Skovde, Sweden

[73] Assignee: AB Todo Produktions & Forsaljningsbolag, Toreboda, Sweden

[21] Appl. No.: 09/020,239

[22] Filed: Feb. 6, 1998

[51] Int. Cl.[6] .................................................. F16L 29/00
[52] U.S. Cl. ................. 251/149.5; 251/347; 137/614.05
[58] Field of Search .................. 137/614.01, 614, 137/614.03, 614.05, 614.06; 251/251, 252, 149.1, 149.5, 347, 149.4

[56] References Cited

U.S. PATENT DOCUMENTS

| | | | |
|---|---|---|---|
| 1,342,678 | 6/1920 | Houghton | 137/614.05 |
| 1,797,363 | 3/1931 | Pierce | 251/149.5 |
| 1,799,433 | 4/1931 | Murphy | 137/614.05 |
| 1,812,038 | 6/1931 | Davis | 251/149.5 |
| 2,248,701 | 7/1941 | Fowler | 251/149.5 |
| 2,598,009 | 5/1952 | Peeps | 251/149.5 |
| 3,441,055 | 4/1969 | Pickell . | |
| 3,625,251 | 12/1971 | Nelson | 137/614.5 |
| 4,651,969 | 3/1987 | Dowdall | 251/252 |

FOREIGN PATENT DOCUMENTS

| | | | |
|---|---|---|---|
| 347989 | 12/1935 | Italy | 251/347 |

*Primary Examiner*—Kevin Lee
*Attorney, Agent, or Firm*—Sughrue, Mion, Zinn, Macpeak & Seas, PLLC

[57] ABSTRACT

A hose coupling member comprises a housing with a through opening and with grooves oriented obliquely along the inner surface of the housing, a piston arranged in the housing to seal the through opening, a shaft attached to the piston, and an actuator arranged inside housing. Upon relative rotation between housing and the actuator shaft will run in grooves and establish a linear relative movement between the housing and the piston, the actuator being arranged and shaped so that the actuator acts directly upon the shaft. Rolls are preferably mounted on the shaft.

6 Claims, 6 Drawing Sheets

COUPLING

TECHNICAL AREA

The present invention relates generally to hose couplings and, more particularly, to couplings for disconnectible connection of a thick hose pipe to a container, the coupling being of the type comprising a male member intended to be permanently mounted at the container, and a female member intended to be permanently attached to the hose and which in its connected position can by a rotational movement be locked together with the male portion.

BACKGROUND

Couplings of this type are above all used for filling tank lorries and the like from the bottom, the male portion as well as the female portion then having self-closing valve which are opened upon interlocking of the two coupling members, generally by means of a locking device of the bayonet catch type. In previously known couplings during a locking phase rolls are caused due to the relative rotation to run in inclined cam grooves arranged in the inner surface of the female member. The rolls are mounted on a transversal shaft in the female member housing, said shaft being connected to the valve piston in the female member. In this way that valve piston is urged into the male member whereby there is formed a through opening so that liquid or gas can freely flow through the coupling.

Especially in the above-mentioned use where the male member is located at the bottom of the tank, the interconnection of the two coupling members must often take place in narrow spaces calling for a sharp bending of the thick hose which in most cases has a diameter of 6–8 cms and thick walls in order to withstand the rather high pressures—often of the size of magnitude 0.7–1.0 Pa. This results in the coupling often being exposed to very powerful breaking stresses acting upon the connection between the male and the female members.

In known hose couplings these stresses cause problems involving inter alia material friction, especially between the rolls and the shaft on which said rolls are mounted, and between the rolls and the cam grooves. This problem is amplified by the fact that, in prior art embodiments, it was necessary to use a short actuator acting upon the piston resulting in an unsatisfactory stability in the coupling. For that reason certain couplings comprise a spring package making the structure stiffer.

A further example of the standing of the art is described in U.S. Pat. No. 3,441,055 (Pickell).

THE OBJECT OF THE INVENTION

The object of the present invention is to avoid the above-mentioned disadvantages in previously known hose couplings.

SUMMARY

The above-mentioned object is attained by use of the realization that, if the actuator is shaped so as to act directly upon the transverse shaft, the above-mentioned disadvantages are avoided and the result will be a hose coupling in which the friction has been reduced and the rigidity increased in comparison with prior art couplings.

Accordingly, a hose coupling member according to the present invention and comprising a housing with a through opening and grooves obliquely directed along the inner surface of the housing, a piston for sealing said through opening, a shaft connected to said piston, and an actuator located inside said housing, said shaft engaging said grooves and generating a linear relative movement between the housing and the piston in response to a relative rotation between the housing and the actuator, is characterized in that the actuator is arranged and shaped so as to act directly upon the shaft.

This arrangement permits use of a longer actuator which improves absorption of breaking stresses. This also makes it possible to dispense with the spring package which in prior art hose couplings is installed to absorb breaking stresses, the result being a reduced friction during the mutual rotation of the coupling members and a cheaper and more reliable hose coupling.

Preferably there are arranged two sets of rolls mounted on the shaft: one set of outer rolls running in the obliquely directed grooves, and one set of inner rolls running in openings in the actuator.

Further characteristics of the invention will appear from the subclaims.

BRIEF DESCRIPTION OF THE DRAWINGS

The invention will below be described in greater detail, reference being made to the attached drawings in which.

DESCRIPTION OF THE PREFERRED EMBODIMENTS

Structural Features

Figure 1:
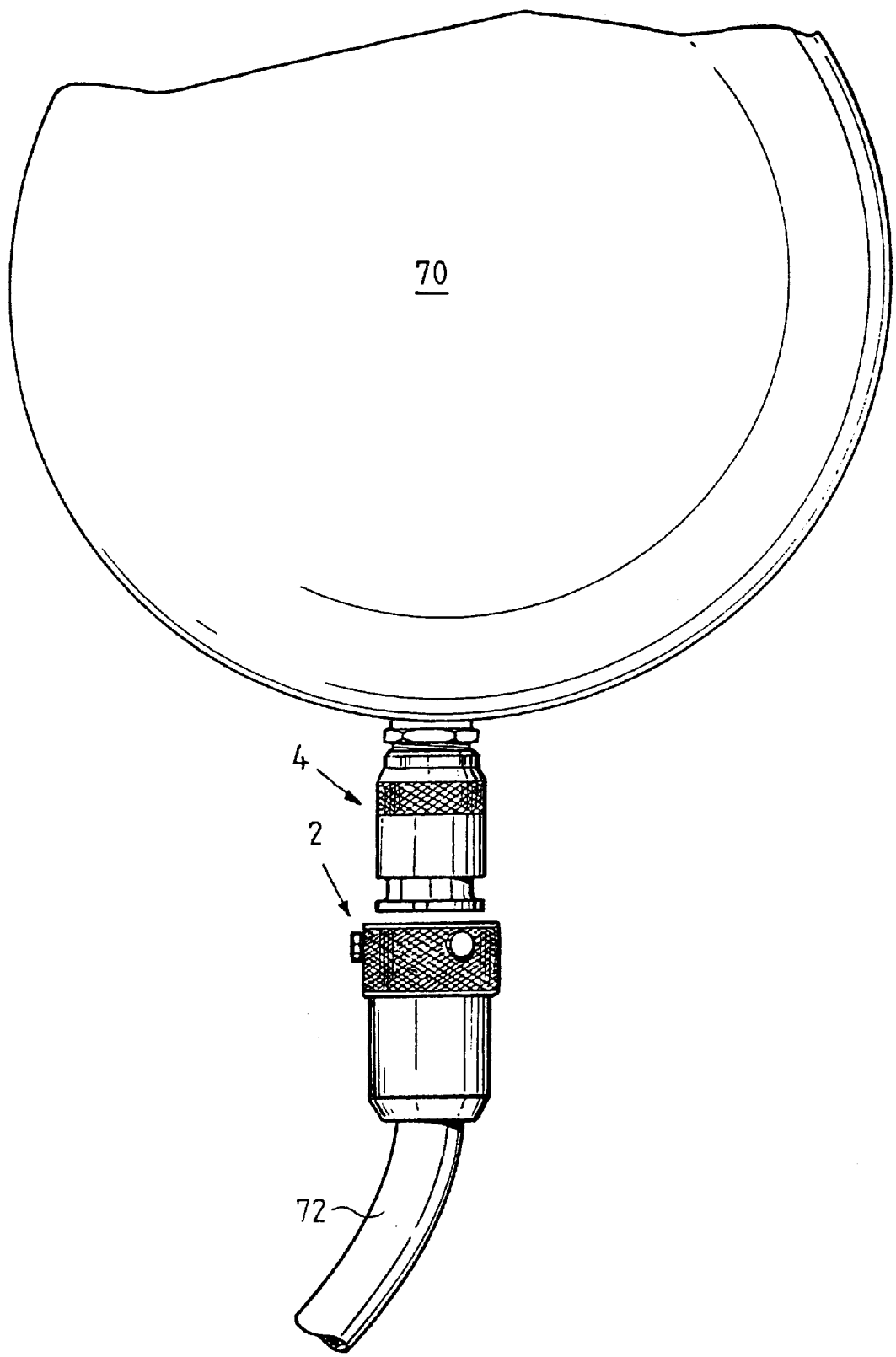
FIG. 1 does diagrammatically show the location on a tank of the members of a hose coupling according to the invention.

In FIG. 1 70 designates the lower part of a container which, by way of example, may be a tank mounted on a vehicle, the male member 4 of a hose connection coupling being permanently mounted in the bottom of the tank.

This male member, which is shaped like a tubular nipple comprising a self-closing valve, forms a tube-like elongation of a opening in the bottom of the tank 70 and is arranged to cooperate with a female member 2 attached to the end of a thick hose 72. The female member 2 is intended to surround the bottom end of the male member 4 and to be secured thereto by means of a bayonet locking device and upon rotation of the female member 2. The female member also comprises a self-closing valve which, like the valve in the male member 4, is opened when the two coupling members are joined together.

Figure 2:
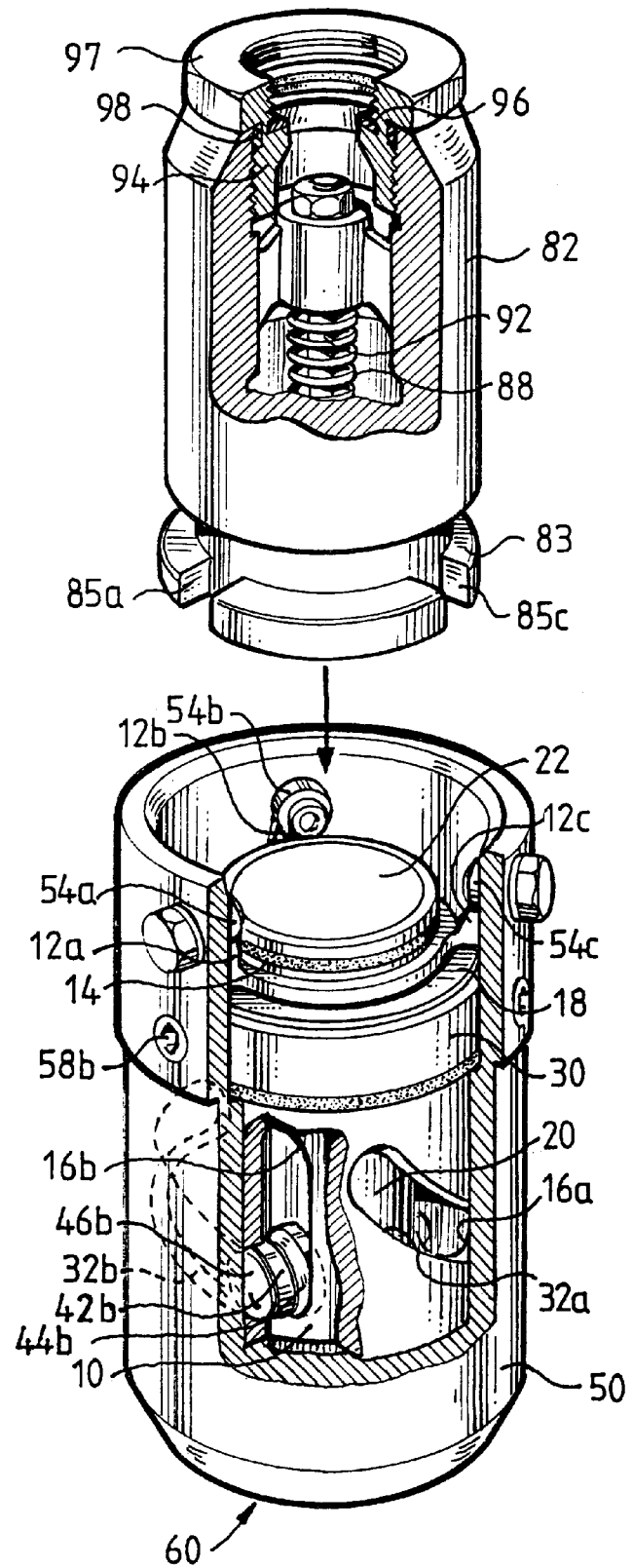
FIG. 2 illustrates the members making up the hose coupling.

FIG. 2 is a perspective view showing a preferred hose coupling according to the invention comprising the male member 4 known per se and the novel female member 2 embodying the invention.

Figure 3:
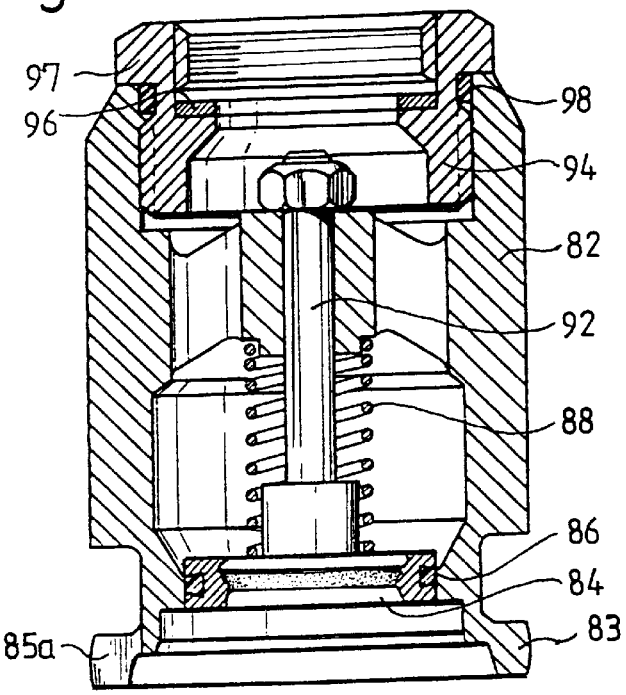
FIG. 3 is a cross-sectional view through a male coupling member known per se.

The male member known per se, which is in a sectional view shown also in FIG. 3, comprises a cylindric housing 82 mounted on the tank 70 (see FIG. 1) by means of a mounting device 97 having a bushing 94 and a flat-packing 96 as well as a O-ring 98 for sealing up the housing. In the housing 82 of the male member the end opposite to the mounting device 97 is provided with a piston 84 which is mounted longitudinally movable in the housing and held spring-biased in its outer position by means of a helical spring 88 resting against a support 92 in the housing. An O-ring 86 provides sealing between the housing and the piston 84 in its outer position.

Figure 4:
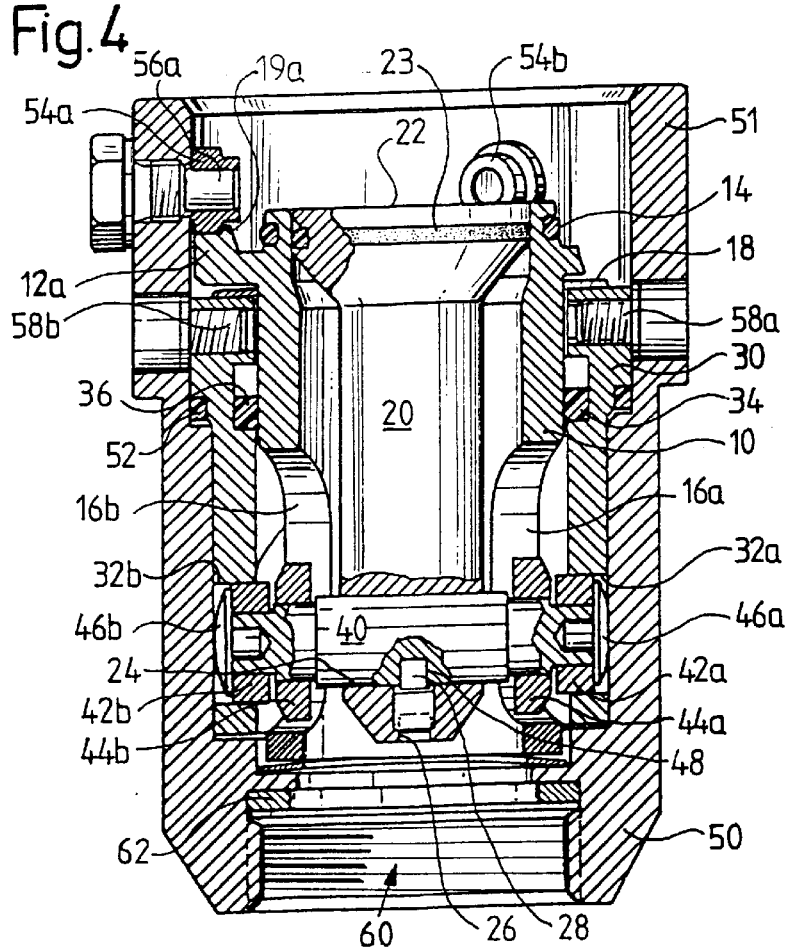
FIG. 4 is a cross-sectional view through a female member in the hose coupling according to the invention.

The female member 2, also seen in cross-section in FIG. 4, does also comprise a housing 50 arranged to engage the male member housing 82. For that reason housing 50 comprises a peripheral flange 51 the inner diameter of which is slightly greater than the outer diameter of the male member housing 82 so that the female member can be brought to enclose the one end of the male member when the two members shall be brought together. When members 2, 4 have been brought together, they are rotated relatively each other, whereby locking rolls 54a–c mounted on shafts 56a–c engage behind projections 83 mounted on the male member housing 82.

Figure 7:
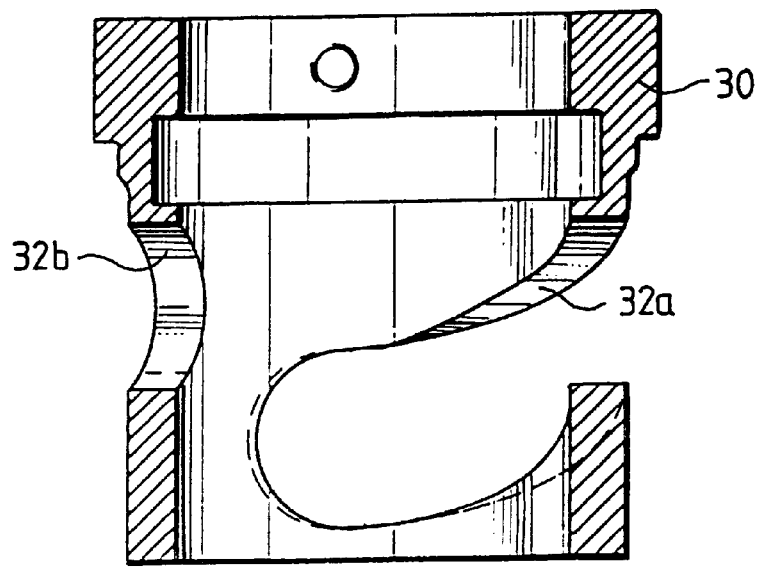

In the housing 50 there is disposed a cylindric cam means 30 exhibiting two obliquely directed cam grooves 32a, b. The shape of those grooves appears more clearly from FIG. 7. Between housing 50 and cam means 30 there is mounted an O-ring 52 providing sealing between those two parts. The cam means is secured to housing 50 by two locking screws 58a, b passing through the housing and the cam means. If required, more than two locking screws may be used.

Inside the cam means 30 there is in turn loosely mounted a cylindric actuator 10, made e.g. of brass, steel or aluminium or of any other material suitable for the purpose. At its one end the actuator has three protrusions 12a–c arranged to engage corresponding recesses 85a–c in the male member housing 82. The protrusions carry fence flanges 19a–c preventing the lock rolls 54a–c from sliding off its related shaft. Further, there is an O-ring 14 in a peripheral groove, said O-ring providing sealing between the male member housing 82 and the actuator 10 when the two coupling members 2, 4 have been brought together. There is also a slide washer 18, for instance of teflon, disposed between the outer portion of the actuator 10 and the cam means, as well as a wear or guide ring 36 e.g. of teflon. The function of the two last-mentioned components is to reduce the friction when the actuator 10 and the cam means 30 are caused to rotate relatively each other.

As has been mentioned before and as appears from the drawings, actuator 10 is substantially cylindric but in the envelope surface there are two openings, or recesses, 16a, b. Those openings are elongated in the direction of the longitudinal axis and have smoothly rounded ends for manufacturing and strength reasons. The openings receive a transversal shaft 40 which will below be described in greater detail.

Figure 8:
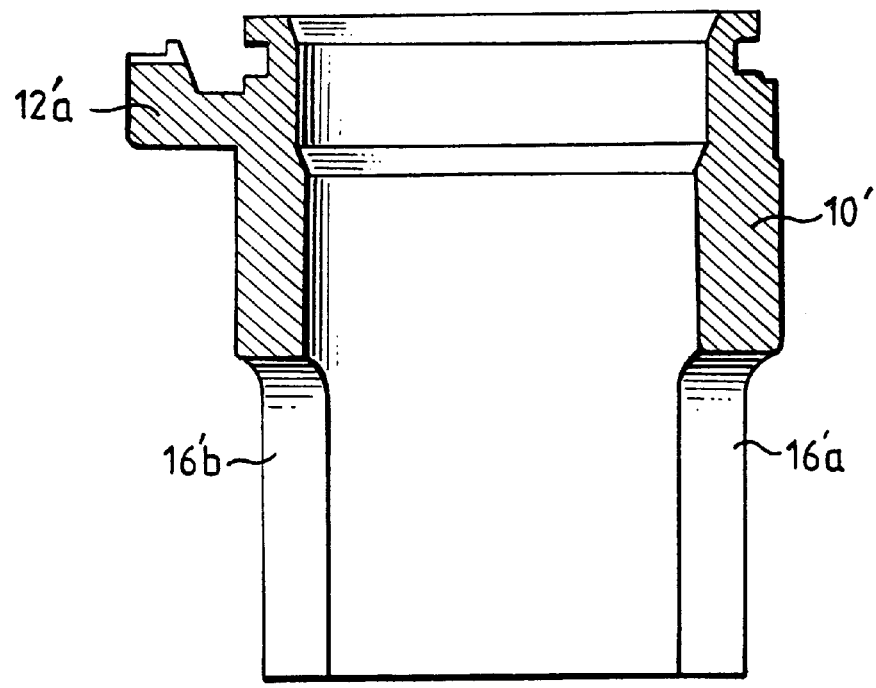
FIG. 8 shows an alternate embodiment of an actuator in the hose coupling.

The actuator can be almost equally long as the housing 50 in which it is mounted. This means that the breaking forces between the coupling halves referred to in the introductions can be absorbed in a better way than if the length were substantially smaller. Also, this does also reduce the wear which upon rotation takes place between the rolls 42a, b in the cam grooves and the housing 50 and between the cam means 30 and the actuator 10. In addition, this makes it possible to omit the spring package used in many prior art hose couplings for the purpose of making the actuator more rigid. However, in order to simplify the manufacturing process and to reduce the consumption of material and thereby also the weight the actuator can be made somewhat shorter than what appears from FIGS. 2 and 4. In FIG. 8 there is shown a modified actuator at which the outermost end turned away from the surface engaging the other coupling half has been cut. This does only very little lower the capacity to absorb breaking stresses.

Inside the actuator 10 there is a piston 20 displaceable in the direction of the longitudinal axis. The piston has a contact surface 22 of a slightly smaller dimension than the piston 84 in the male member. Further, adjacent to said contact surface the piston has a peripheral groove in which there is disposed an O-ring 23 for sealing between actuator 10 and piston 20.

In a transversal bore 24 in the piston, adjacent to its end opposite to the contact surface, there is a shaft 40, the shape of which does most clearly appear from FIG. 4. The mounting position of the shaft is maintained by means of a locking pin 28 engaging a recess 26 in the piston substantially along the longitudinal axis of the piston.

Mounted on shaft 40 are two roll pairs, a pair of first, outer rolls 42a, b and a pair of second, inner rolls 44a, b. The inner rolls run in the recesses 16a, 16b in the actuator whereas the outer rolls run in the cam grooves 32a, 32b in the cam means. Farthest out on shaft 40, at the end surfaces thereof, there are mounted caps 46a, 46b of a low-friction material, e.g. teflon, in order to reduce the friction between shaft 40 and the inner side of housing 50.

At the end of the female member housing 50 there is in a known manner attached a hose 72 (shown in FIG. 1) or the like by means of a hose receiver 60 comprising e.g. a screwed or integrated swivel (not shown) and a flat package 62 of teflon or vulculan.

Mode of Operation

Figure 5:
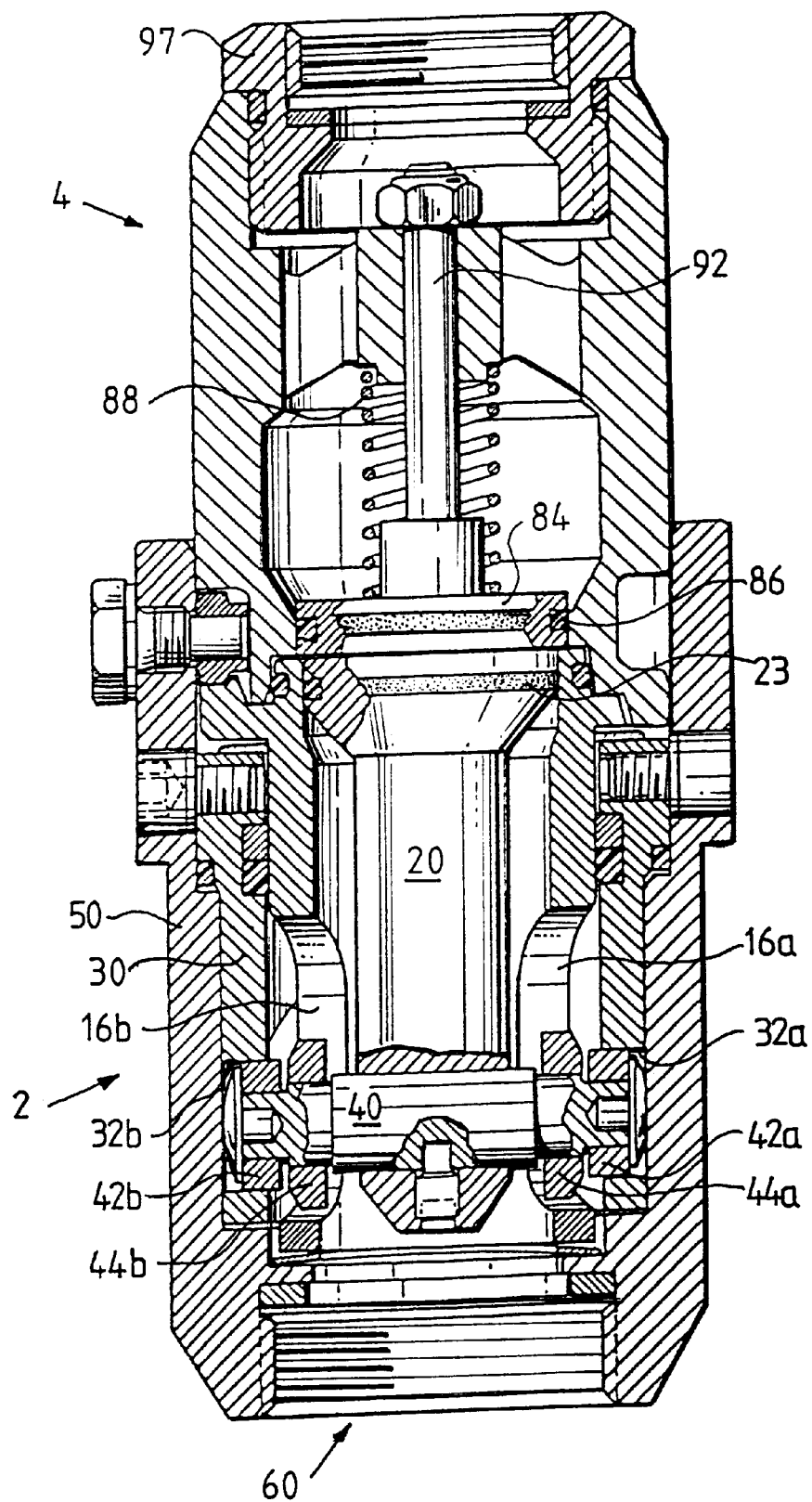
FIG. 5 shows the members illustrated in FIGS. 3 and 4 brought together but not interconnected.

The function of the hose coupling according to the invention will now be described, FIG. 5 showing a cross-section through the female and male members 2 and 4, respectively, brought together but not interconnected and locked to each other, whereas in FIG. 6 the coupling halves have been shown in a mutually locked position following an approximately 100° rotation, the passage between the coupling halves being open.

In the initial position, shown in FIG. 5, the coupling halves have been brought together into a position in which the protrusions 12 on the actuator of the female member engage the recesses 85 in the male member housing 82. When the housings 50, 82 of the coupling members 2 and 4, respectively, are rotated mutually, the actuator will accompany the male member housing 82, i.e. the actuator is caused to rotate in and relatively the female member housing 50 and cam means 30. The inner rolls 44a, 44b mounted on shaft 40 and running in the openings 16a, 16b in the actuator participate in that rotational movement. In this way also piston 20 is caused to rotate relatively the female member housing 50 and the cam means 30.

When shaft 40 and, consequently, also piston 20 is rotated, the outer rolls 42a, 42b are forced to move in the oblique cam grooves 32a, 32b in the cam portion. They have such an inclination that to shaft 40, and accordingly also to piston 20, is without any difficulty imparted a linear movement relatively housing 50 in the direction towards the other coupling half 4. This movement does in turn force piston 84 into the male member housing 82 causing compression of helical spring 88. When the members have been rotated by about 100°, the outer rolls 42a, b reach their end positions in the cam grooves 32a, b, so that continued rotation is blocked. A return movement of the rolls in the cam grooves is then counteracted by a small projection (not shown), so that a locking position is attained.

Figure 6:
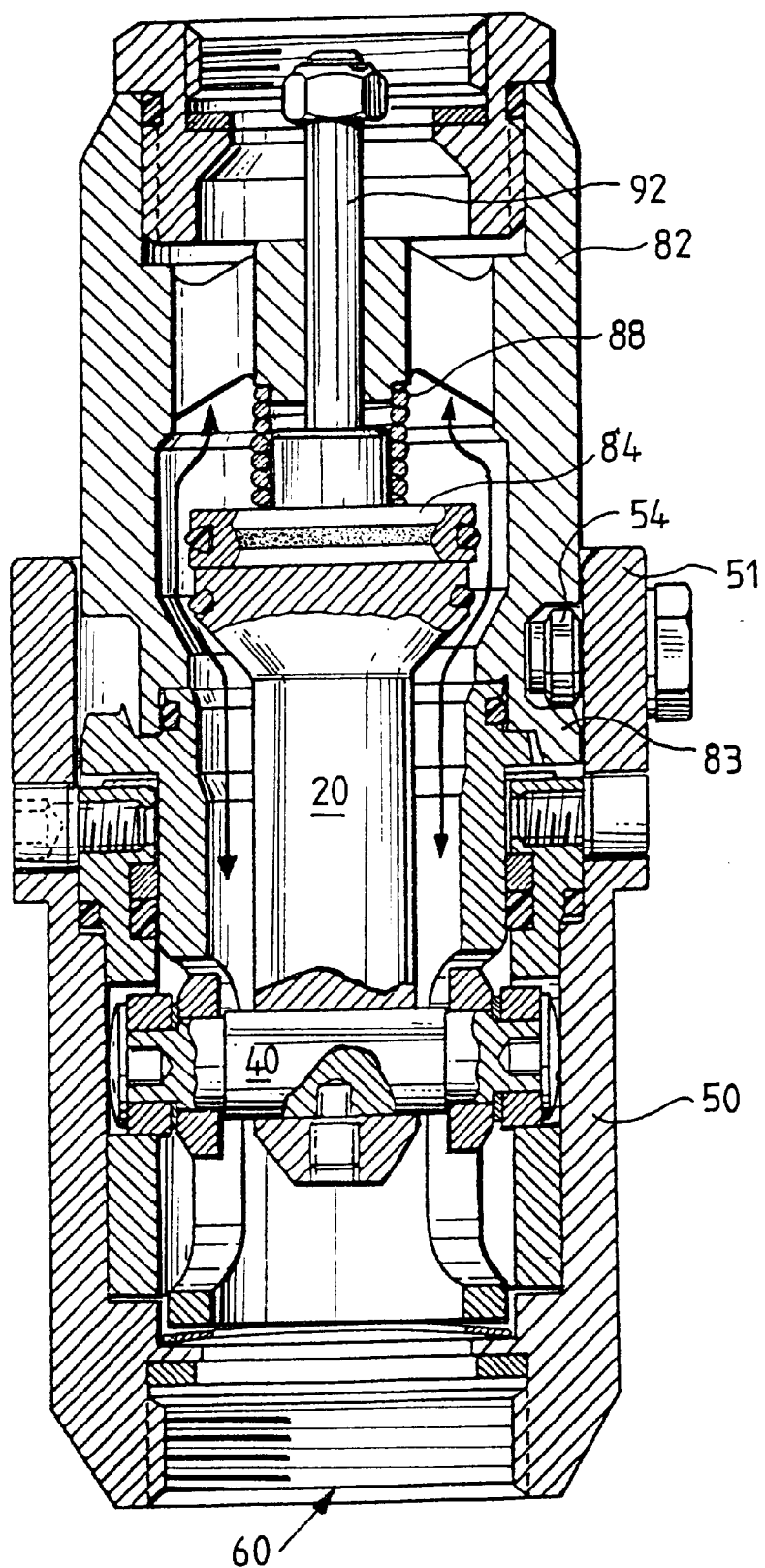
FIG. 6 shows the members illustrated in FIGS. 3 and 4 brought together and interconnected, FIG. 7 does in greater detail show a cam portion forming part of the male member.

Piston 20 has then been pressed that deep into the other coupling half 4 that a fluid in gas or liquid state can freely pass through the coupling along the routes marked with arrows in FIG. 6. Thanks to the cylindric shape of piston 20 the flow pattern will, as compared with prior art couplings, become softer resulting in an improved fluid flow.

When the coupling halves are to be disconnected, the houses are rotated relatively each other in the direction opposite the locking direction, so that the outer rolls 42a, b and accordingly also piston 20 will resume their initial positions as will also piston 84 in the male member, whereby fluid flow through the coupling is prevented.

In FIG. 8 there is shown an alternative embodiment of actuator 10. Since it is fixed in the axial direction its end facing the hose can be cut, so that there is created an actuator which is both lighter and simpler to manufacture.

Due to the fact that the female member according to the invention can function together with existing male members having the same coupling socket there is attained an exchangeability making it unnecessary to replace the male members which, naturally, is an advantage.

While there has above been described preferred embodiments of the invention the skilled artisan will realize that they can be varied and modified within the scope of the annexed claims. The materials suggested can be varied, for example in the way that the slide components are made from other materials than teflon having a low coefficient of friction. Also, the materials used in the other components may be varied to match the substances for which the hose coupling is to be used.

According to the preferred embodiment there are used rolls 42a, b and 44a, b. Naturally, they can be omitted or replaced by guide or slide blocks performing the corresponding function.

Further, shaft 40, which in the preferred embodiment is disconnectably secured to piston 20, may also be integral with the piston proper.

Fence flanges 19a–c may advantageously be replaced by pins inserted in projections 12a–c and yielding the same function. This simplifies the manufacturing of the actuator.

It is not necessary for the openings, or recesses, 16a, b in the actuator to have smoothly rounded ends but may be straight or have some other shape fitting the purpose.

Not withstanding the fact that in the device shown there are grooves 32a, b in the inner surface of housing 50 in which shaft 40 runs, the opposite arrangement is also imaginable, meaning that on the inner surface of the housing there are obliquely oriented projections engaging the shaft.

I claim:

1. A hose coupling member, comprising:
    a housing having a through opening and grooves (32a, b) obliquely directed along an inner surface of the housing, a piston (20) for sealing said through opening, a transverse shaft (40) connected to said piston, and an actuator (10) located inside said housing, said shaft engaging said grooves and generating a linear relative movement between the housing and the piston in response to a relative rotation between the housing and the actuator, wherein the actuator defines openings (16a, b) receiving the transverse shaft such that, in response to a relative rotation between the housing and the actuator, a part of the actuator defining the openings acts directly on the transverse shaft in a direction parallel to the direction of rotation, and the piston connected to the shaft is rotated relative to the housing.

2. A hose coupling according to claim 1, further comprising a first pair of rolls (42a, b) mounted on the shaft and running in said grooves.

3. A hose coupling member according to claim 2, further comprising a second pair of rolls (44a, b) mounted on the shaft and running in said openings in the actuator.

4. A hose coupling member according to claim 1, further comprising caps (46a, b) located on the end surfaces of the shaft and consisting of a material having a low coefficient of friction.

5. A hose coupling member according to claim 1, wherein the actuator has a length corresponding to a length of the piston.

6. A hose coupling member according to claim 1, wherein the shaft is disconnectably secured to the piston.

\* \* \* \* \*